(12) United States Patent
Liu et al.

(10) Patent No.: US 11,966,693 B2
(45) Date of Patent: Apr. 23, 2024

(54) ELECTRONIC DEVICE AND METHOD FOR EDITING RESUME

(71) Applicant: Trantor Tech, Inc., Taipei (TW)

(72) Inventors: Chun Yi Liu, Taipei (TW); Cheng-Min Ting, Taipei (TW); Chun Ling Pan, Taipei (TW)

(73) Assignee: TRANTOR TECH, INC., Taipei (TW)

( * ) Notice: Subject to any disclaimer, the term of this patent is extended or adjusted under 35 U.S.C. 154(b) by 0 days.

(21) Appl. No.: 17/862,395

(22) Filed: Jul. 11, 2022

(65) Prior Publication Data

US 2023/0040241 A1    Feb. 9, 2023

(30) Foreign Application Priority Data

Jul. 30, 2021    (TW) ................. 110128095

(51) Int. Cl.
*G06F 3/048*    (2013.01)
*G06F 3/0486*    (2013.01)
*G06F 40/186*    (2020.01)

(52) U.S. Cl.
CPC .......... *G06F 40/186* (2020.01); *G06F 3/0486* (2013.01)

(58) Field of Classification Search
CPC ............................. G06F 40/186; G06F 3/0486
See application file for complete search history.

(56) References Cited

U.S. PATENT DOCUMENTS

2002/0065852 A1*   5/2002   Hendrickson ......... G06F 40/174
                                                       715/236
2008/0262859 A1*   10/2008   Ting ....................... G06Q 10/06
                                                       705/1.1
2010/0235411 A1*   9/2010   Bray ..................... G06F 16/958
                                                       707/812
2010/0257471 A1*   10/2010   Ang ...................... G06F 3/0486
                                                       715/769
2012/0084633 A1*   4/2012   Dondurur ............ G06Q 10/105
                                                       715/226

(Continued)

FOREIGN PATENT DOCUMENTS

CN            104050532        9/2014
CN            109766535        5/2019

(Continued)

OTHER PUBLICATIONS

"Office Action of Taiwan Counterpart Application", dated Sep. 16, 2022, pp. 1-8.

*Primary Examiner* — Rashawn N Tillery

(74) *Attorney, Agent, or Firm* — WPAT, P.C

(57) ABSTRACT

An electronic device and a method for editing a resume are provided. The electronic device includes a display, a transceiver, a storage medium, and a processor. The processor receives personal information through the transceiver, and inputs the personal information into a plurality of item templates to generate an item template with personal information and a blank item template without personal information corresponding to the plurality of item templates. The processor displays the plurality of item templates through the display, and receives a first input operation to add a first item template and a second item template in the plurality of item templates to a resume display area to generate a resume. The processor outputs the resume through the transceiver.

14 Claims, 10 Drawing Sheets

(56) References Cited

U.S. PATENT DOCUMENTS

| | | | | |
|---|---|---|---|---|
| 2014/0013212 A1* | 1/2014 | Von Haden | ............ | G06F 40/186 |
| | | | | 715/243 |
| 2017/0365021 A1* | 12/2017 | Stading | ................ | G06Q 50/184 |
| 2018/0322465 A1* | 11/2018 | Safikhani | .............. | G06F 16/958 |
| 2019/0034879 A1* | 1/2019 | Allison | .................. | G06Q 10/10 |
| 2019/0138637 A1* | 5/2019 | Hogan | ................. | G06F 40/216 |
| 2020/0074567 A1 | 3/2020 | Sharif | | |
| 2020/0242562 A1* | 7/2020 | Murray | ................. | G06F 3/0481 |
| 2022/0114331 A1* | 4/2022 | Kantrow Slosar | .... | G06F 40/106 |

FOREIGN PATENT DOCUMENTS

| | | | |
|---|---|---|---|
| CN | 109766535 A | * | 5/2019 |
| CN | 110390086 A | * | 10/2019 |
| TW | 202109388 | | 3/2021 |

* cited by examiner

| 3211 | IoT product development | | ☐ Name |
|---|---|---|---|
| 3212 | Patent litigation | | ☐ Work experience |
| 3213 | Possessing OO license | | ☑ Professional skill |
| | | | ☐ Professional license |
| | | | ☐ Customize |

FIG. 8A

| 3211 | IoT product development | | ☐ Name |
|---|---|---|---|
| 3212 | Patent litigation | | ☐ Work experience |
| 3213 | Possessing OO license | | ☐ Professional skill |
| | | | ☐ Professional license |
| | | | ☐ Customize |

FIG. 8B

ELECTRONIC DEVICE AND METHOD FOR EDITING RESUME

CROSS-REFERENCE TO RELATED APPLICATION

This application claims the priority benefit of Taiwanese application no. 110128095, filed on Jul. 30, 2021. The entirety of the above-mentioned patent application is hereby incorporated by reference herein and made a part of this specification.

BACKGROUND

Technical Field

The disclosure relates to an electronic device and a method for editing a resume.

Description of Related Art

Job seekers typically spend a great amount of effort and time on editing a resume and the overall layout thereof in order to receive the favor and attention by human resources personnel or heads of companies among a great number of resumes.

However, the existing apparatus and method for editing a resume do not provide editing with facilitated operation. In a case where a job seeker intends to update the layout of the resume during typesetting, the job seeker is required to enter personal information again. As such, a user spends a greater amount of time on editing and typesetting the resume. Therefore, how to provide an electronic device and a method for editing a resume which are highly intuitive with facilitated operation has become an issue to be addressed and a development direction for the related industry.

SUMMARY

The disclosure provides an electronic device and a method for editing a resume, which provide highly intuitive operation and instant and bidirectional editing of a resume.

The disclosure provides an electronic device for editing a resume. The electronic device includes a display, a transceiver, a storage medium, and a processor. The transceiver is coupled to the display. The storage medium stores a plurality of item templates and a resume display area. The processor is coupled to the storage medium and the transceiver. The processor is configured to receive personal information through the transceiver; input the personal information into the plurality of item templates to generate an item template with personal information and a blank item template without personal information corresponding to the plurality of item templates, and display the plurality of item templates through the display; receive a first input operation through the transceiver to add a first item template and a second item template in the plurality of item templates to the resume display area to generate a plurality of resume items comprising a first resume item corresponding to the first item template and a second resume item corresponding to the second item template, to generate a resume having the plurality of resume items; and output the resume through the transceiver.

In an embodiment of the disclosure, the processor receives a second input operation through the transceiver to edit the first resume item on the resume display area, and generates the resume according to the first resume item being edited.

In an embodiment of the disclosure, the processor updates at least one item template in the plurality of item templates according to the first resume item being edited, and displays the at least one item template being updated through the display.

In an embodiment of the disclosure, the first input operation is a drag operation. The first resume template and the second resume template are longitudinally arranged on the resume display area according to a drag sequence or an upward/downward operation command.

In an embodiment of the disclosure, the first resume item on the resume display area includes a first functional icon. The processor divides the resume display area into a first column and a second column in response to receiving a second input operation corresponding to the first functional icon through the transceiver. The first resume item and the second resume item are respectively disposed in the first column and the second column.

In an embodiment of the disclosure, the first resume item on the resume display area includes a second functional icon. The processor establishes a label corresponding to a text box in the first item template in response to receiving a second input operation corresponding to the second functional icon through the transceiver. The processor updates at least one item template corresponding to the label in the plurality of item templates according to the text box.

In an embodiment of the disclosure, the processor configures the label as a predetermined label in response to the text box matching a predetermined text box.

In an embodiment of the disclosure, the processor receives a third input operation through the transceiver in response to the text box not matching a predetermined text box. The processor establishes the label according to the third input operation.

In an embodiment of the disclosure, the processor fills predetermined data into a text box in the first item template in response to the personal information lacking data matching the text box. The predetermined data includes at least one of predetermined text information and predetermined font format information.

In an embodiment of the disclosure, the processor displays a tip box corresponding to a first position in the resume display area through the display in response to the first item template being dragged to the first position of the resume display area. The processor displays the tip box through the display in response to a first portion of the first item template being dragged over a boundary between the plurality of item templates and the resume display area.

The disclosure provides a method for editing a resume. The method includes the following. A plurality of item templates and a resume display area are pre-stored. Personal information is received. The personal information is input into the plurality of item templates to generate an item template with personal information and a blank item template without personal information corresponding to the plurality of item templates, and the plurality of item templates are displayed through a display. A first input operation is received to add a first item template and a second item template in the plurality of item templates to the resume display area to generate a plurality of resume items comprising a first resume item corresponding to the first item template and a second resume item corresponding to the second item template, to generate a resume having the plurality of resume items. The resume is output.

In an embodiment of the disclosure, generating the resume having the plurality of resume items includes the following. A second input operation is received to edit the first resume item on the resume display area. The resume is generated according to the first resume item being edited.

In an embodiment of the disclosure, the method further includes the following. At least one item template in the plurality of item templates is updated according to the first resume item being edited. The at least one item template being updated is displayed through the display.

In an embodiment of the disclosure, the first input operation is a drag operation. The first resume template and the second resume template are longitudinally arranged on the resume display area according to a drag sequence or an upward/downward operation command.

In an embodiment of the disclosure, the first resume item on the resume display area includes a first functional icon. The method further includes the following. The resume display area is divided into a first column and a second column in response to receiving a second input operation corresponding to the first functional icon. The first resume item and the second resume item are respectively disposed in the first column and the second column.

In an embodiment of the disclosure, the first resume item on the resume display area includes a second functional icon. The method further includes the following. A label corresponding to a text box in the first item template is established in response to receiving a second input operation corresponding to the second functional icon. At least one item template corresponding to the label in the plurality of item templates is updated according to the text box.

In an embodiment of the disclosure, the method further includes the following. The label is configured as a predetermined label in response to the text box matching a predetermined text box.

In an embodiment of the disclosure, the method further includes the following. A third input operation is received in response to the text box not matching a predetermined text box. The label is established according to the third input operation.

In an embodiment of the disclosure, the method further includes the following. Predetermined data is filled into a text box in the first item template in response to the personal information lacking data matching the text box. The predetermined data includes at least one of predetermined text information and predetermined font format information.

In an embodiment of the disclosure, the method further includes the following. A tip box corresponding to a first position in the resume display area is displayed through the display in response to the first item template being dragged to the first position of the resume display area. The above includes the following. The tip box is displayed through the display in response to a first portion of the first item template being dragged over a boundary between the plurality of item templates and the resume display area.

Based on the foregoing, the electronic device of the disclosure can provide instant editing and generate a resume according to the edited first resume item for a user to conveniently and intuitively edit and modify the content and the layout of the resume, and output the resume to the display and the storage medium.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 8A and FIG. 8B are schematic diagrams of a labeling operation according to an embodiment of the disclosure.

DESCRIPTION OF THE EMBODIMENTS

Figure 1:
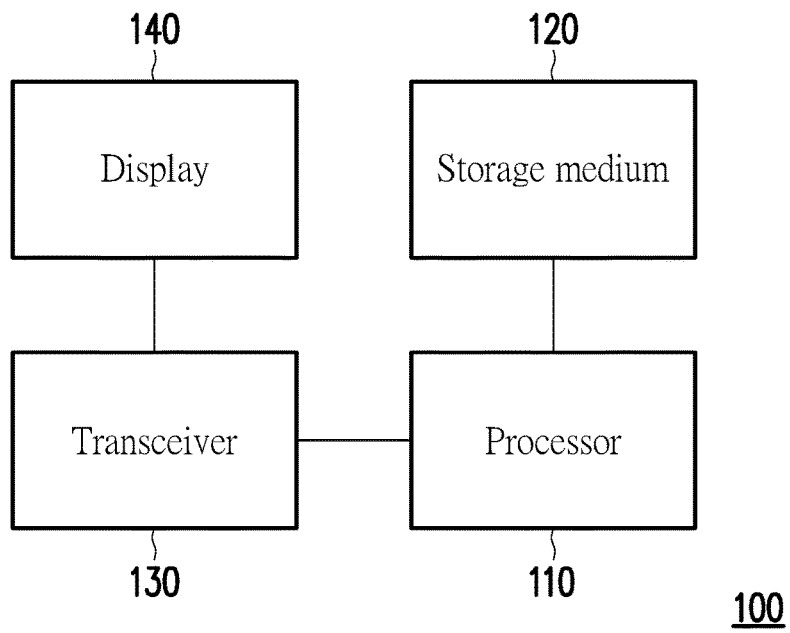
FIG. 1 is a schematic diagram of an electronic device for editing a resume according to an embodiment of the disclosure.

To facilitate comprehension of the content of the disclosure, the following embodiments are provided as examples according to which the disclosure can reliably be carried out. In addition, wherever possible, elements/members/steps using the same reference numerals in the drawings and embodiments denote the same or similar parts.

FIG. 1 is a schematic diagram of an electronic device 100 for editing a resume according to an embodiment of the disclosure. The electronic device 100 may include a display 140, a transceiver 130, a storage medium 120, and a processor 110.

The processor 110 is, for example, a central processing unit (CPU), or any other programmable general-purpose or special-purpose micro control unit (MCU), microprocessor, digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable gate array (FPGA), or other similar elements or a combination of the elements above. The processor 110 may be coupled to the storage medium 120, the transceiver 130, and the display 140. In addition, the processor 110 may access and execute a plurality of modules and various applications stored in the storage medium 120.

The storage medium 120 is, for example, any type of fixed or removable random access memory (RAM), read-only memory (ROM), flash memory, hard disk drive (HDD), solid state drive (SSD), or similar elements or a combination of the elements above. In addition, the storage medium 120 is configured to store a plurality of modules or various applications executable by the processor 110.

The transceiver 130 transmits and receives signals in a wireless or wired manner. The transceiver 130 may also perform operations such as low noise amplification, impedance matching, frequency mixing, frequency up-conversion or down-conversion, filtering, amplification, and the like. In an embodiment, the processor 110, the storage medium 120, and the transceiver 130 may be disposed on a cloud platform or in a cloud device, and the display 140 may be disposed in a user-end or local-end host. In other words, the user may achieve remote editing of a resume through the content displayed by the display 140.

The display 140 is, for example, a liquid-crystal display (LCD), a light-emitting diode (LED) display, a vacuum fluorescent display (VFD), a plasma display panel (PDP), an organic light-emitting diode (OLED) display, or a field-emission display (FED).

The storage medium 120 may store a plurality of item templates and a plurality of resume templates. Different item templates may correspond to the same or different data. For example, the plurality of item templates may include "item template 1" and "item template 2". "Item template 1" includes text boxes corresponding to "name" and "title", as shown in Table 1. "Item template 2" includes text boxes corresponding to "name" and "contact", as shown in Table 2. In other words, "item template 1" may include the same data (e.g., the text box corresponding to "name") as "item template 2", and may include different data (e.g., the text box corresponding to "title") from "blank item template 2". Each item template may correspond to one or more types of data. For example, data corresponding to an item template may be any one below: name, work experience, autobiography, title, contact, personal specialty, education, language ability, professional skill, professional license, certificate, and a combination of any two or more of the above. The text box may include text information or font format information. For example, text in the text box may be presented in, for example, red or bold among other font formats.

TABLE 1

(Name)
(Title)

TABLE 2

(Name)
(Contact)

Figure 2:
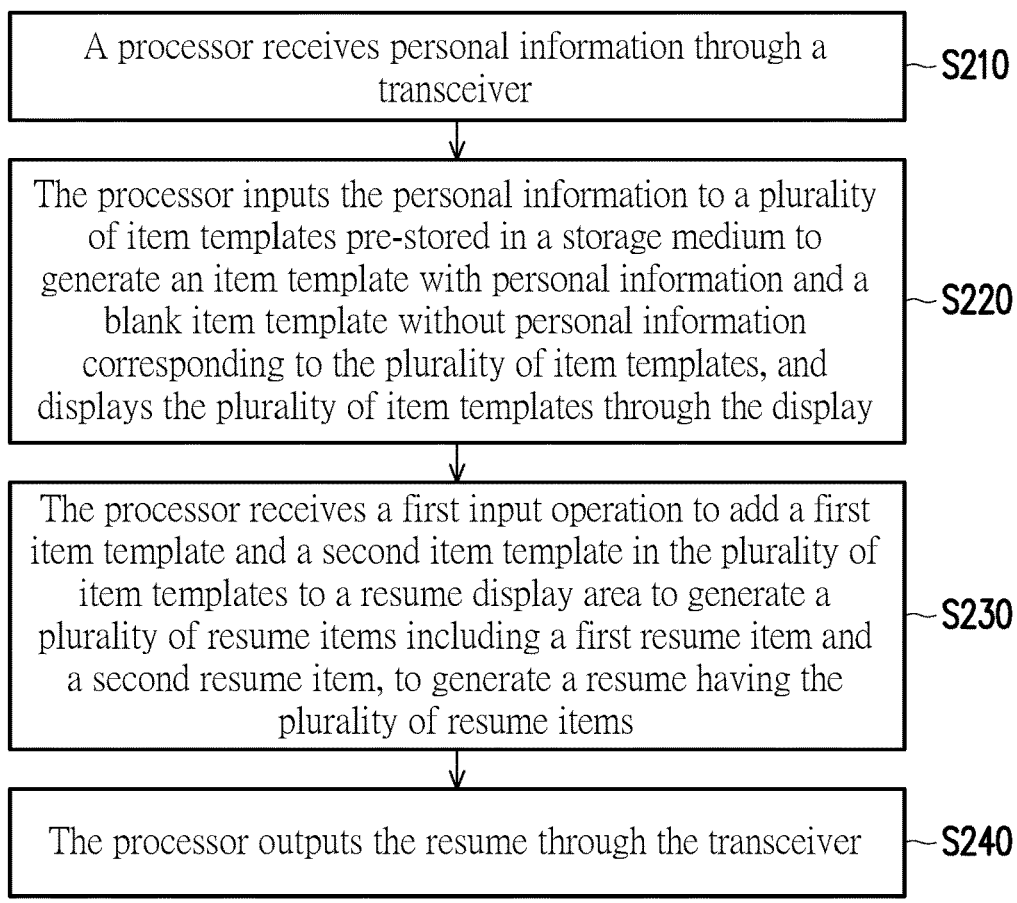
FIG. 2 is a flowchart of a method for editing a resume according to an embodiment of the disclosure.

FIG. 2 is a flowchart of a method for editing a resume according to an embodiment of the disclosure. The method may be implemented by the electronic device 100 as shown in FIG. 1.

In step S210, the processor 110 may receive personal information through the transceiver 130. For example, the personal information may include, but is not be limited to, name, phone, work experience, autobiography, title, contact, personal specialty, education, language ability, professional skill, professional license, certificate, and other information and content related to a resume.

In step S220, the processor 110 may input the personal information into the plurality of item templates pre-stored in the storage medium 120 to generate an item template with personal information and a blank item template without personal information corresponding to the plurality of item templates, and may display the plurality of item templates through the display 140. In other words, the processor 110 may fill the personal information into a corresponding text box in an item template to generate an item template with personal information, and the item template may include partial or complete personal information. In addition, the processor 110 may not fill the personal information into a corresponding text box in an item template to generate a blank item template without personal information. The processor 110 may also display the item templates through the display 140.

Figure 3:
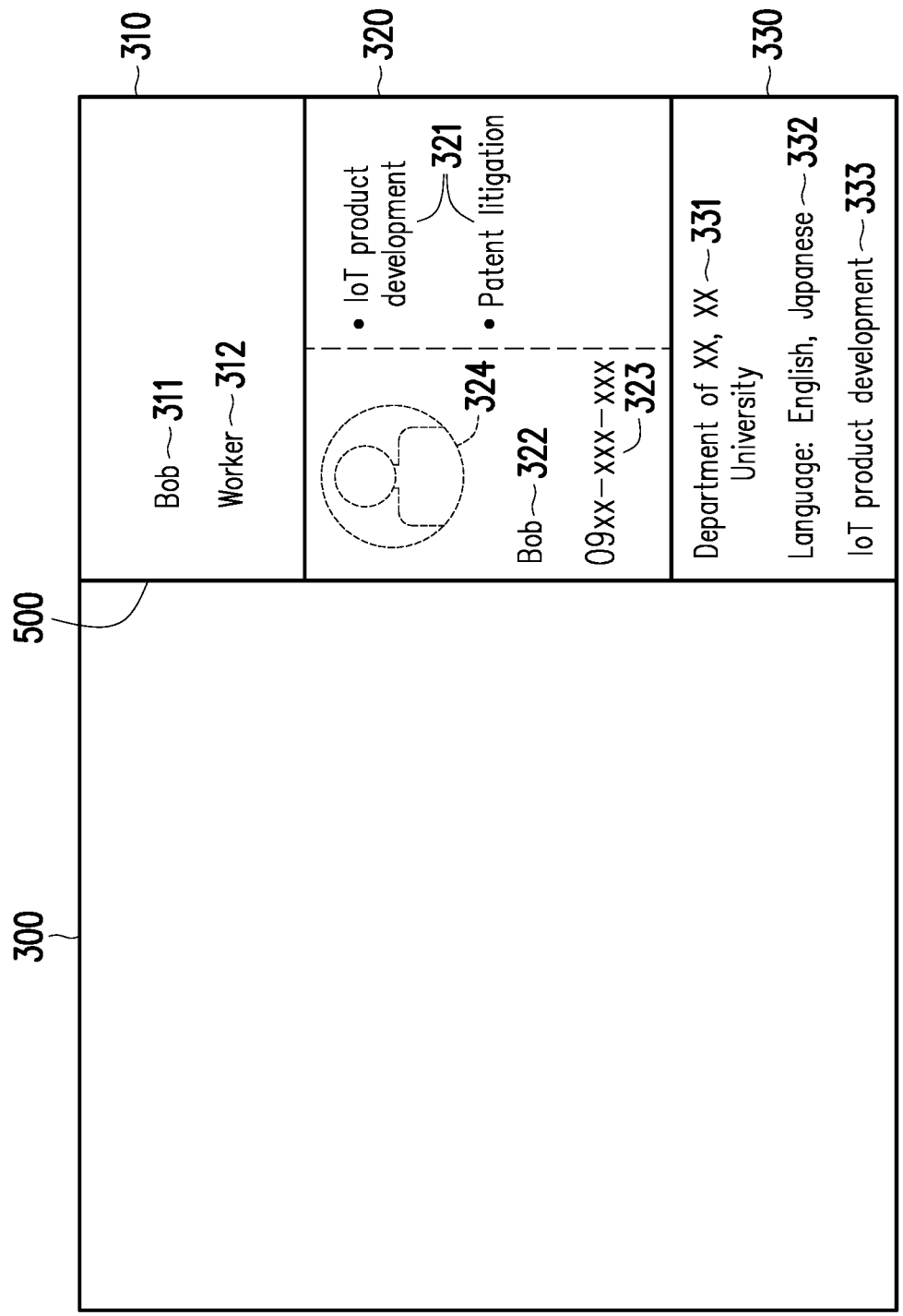
FIG. 3 is a schematic diagram of a resume template according to an embodiment of the disclosure.

FIG. 3 is a schematic diagram of a resume template according to an embodiment of the disclosure. As shown in FIG. 3, the resume template may include a resume display area 300 and a plurality of item templates (e.g., an item template 310, an item template 320, or an item template 330). The processor 110 may display the resume display area 300 and the plurality of item templates of the resume template through the display 140. In an embodiment, the item template displayed by the display 140 may be the item template with personal information. In an embodiment, the item template displayed by the display 140 may be the blank item template without personal information. The resume display area 300 and the plurality of item templates may be separated by a boundary 500. In response to the user inputting the personal information, the processor 110 may generate the plurality of item templates (e.g., the item template 310, the item template 320, or the item template 330) corresponding to the blank item template and the personal information. For example, the processor 110 may fill "Bob" recorded in the personal information into a text box 311 corresponding to "name" in an item template, and may fill "general worker" recorded in the personal information into a text box 312 corresponding to "title" in the item template to generate the item template 310 as shown in FIG. 3. The processor 110 may generate the item template 320 and the item template 330 as shown in FIG. 3 by inputting the personal information into different types of item templates in a similar manner to generating the item template 310. The item template 320 may include a photo 324, a text box 322 corresponding to "name", a text box 323 corresponding to "contact", a text box 321 corresponding to "work experience", and the like. The item template 330 may include a text box 331 corresponding to "education", a text box 332 corresponding to "language ability", and a text box 333 corresponding to "professional skill".

Figure 4:
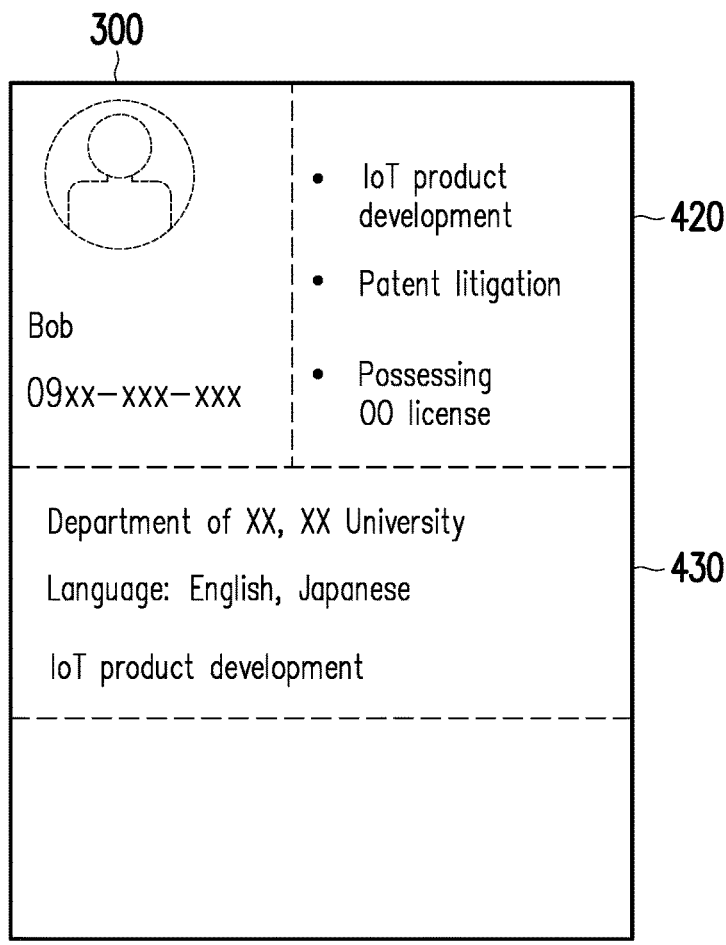
FIG. 4 is a schematic diagram of a resume display area and a resume item according to an embodiment of the disclosure.

FIG. 4 is a schematic diagram of a resume display area and a resume item according to an embodiment of the disclosure. In step S230, the processor 110 may receive a first input operation to add a first item template (e.g., the item template 320) and a second item template (e.g., the item template 330) in the plurality of item templates to the resume display area 300 to generate a plurality of resume items including a first resume item (e.g., a resume item 420), a second resume item (e.g., a resume item 430), and so on to generate a resume including the plurality of resume items. The first resume item corresponds to the first item template, and the second resume item corresponds to the second item template. For example, the first input operation may be a drag operation. The processor 110 may receive the first input operation and drag the item template 320 and the item template 330 to the resume display area 300 to generate the resume item 420 and the resume item 430.

In an embodiment, the item template displayed by the display 140 corresponds to the blank item template without personal information before the first input operation, and the item template displayed by the display 140 corresponds to the item template with personal information after the first input operation. Taking the item template 310 and a resume item 410 as an example, in the item template 310 displayed by the display 140 before the item template 310 is dragged to the resume display area 300, the text box 311 may display "name" and the text box 312 may display "title". Comparatively, in the item template 310 displayed by the display 140 after the item template 310 is dragged to the resume display area 300 and the resume item 410 is generated, the text box 311 may display "Bob" recorded in the personal information and the text box 312 may display "worker" recorded in the personal information.

In step S240, the processor 110 may output the resume through the transceiver 130. For example, the processor 110 may transmit the resume to and store the resume in the storage medium 120, and the processor 110 may present the resume on the display 140 through the transceiver 130. For another example, the processor 110 may transmit the resume through the transceiver 130 to a terminal device (e.g., a computer in the human resources department).

Figure 5:
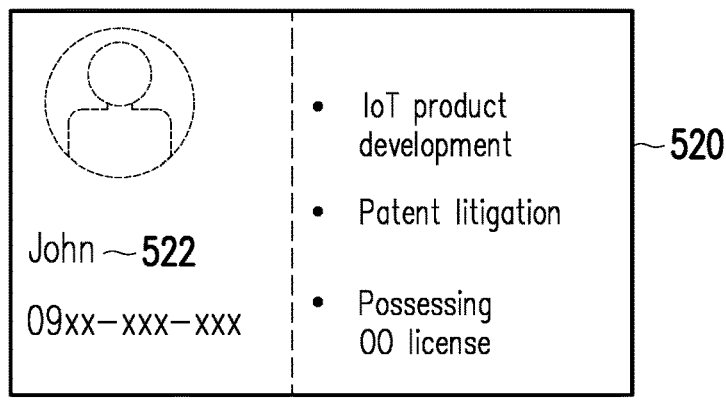
FIG. 5 is a schematic diagram of the edited resume item according to an embodiment of the disclosure.

In an embodiment, the processor 110 may receive a second input operation through the transceiver 130 to edit the first resume item on the resume display area, and generate the resume according to the edited first resume item. In other words, the user may directly edit the content of the resume item on the resume display area, which mitigates time consumption and inconvenient operation caused by the conventional requirements that the format be first archived before the displayed page can be switched to the page for editing the data content. For example, according to the second input operation, the processor 110 may edit the text box 322 corresponding to "name" in the resume item 420 (or the item template 320), modify the text box 322 from "Bob" to "John" to generate a text box 522, and generate an edited resume item 520, as shown in FIG. 5. FIG. 5 is a schematic diagram of the edited resume item 520 according to an embodiment of the disclosure.

In an embodiment, the processor 110 may update at least one item template (or at least one resume item) in the plurality of item templates (or the plurality of resume items) according to the edited first resume item, and may display the updated at least one item template through the display 140. In other words, the processor 110 may update the item template that has the same content as the edited first resume item in the plurality of item templates according to the edited first resume item. For example, the user edits the text box "name" in a resume item in the resume display area 300, and the content of the item template including the text box "name" in the plurality of item templates is updated according to the edited resume item. Taking FIG. 3 and FIG. 5 as an example, after editing the text box 522 corresponding to "name" and generating the edited resume item 520, the processor 110 may modify the content of the text box 311 corresponding to "name" in the item template 310 from "Bob" to "John" according to the edited resume item 520.

In an embodiment, the processor 110 may update the personal information according to the edited first resume item, and output the updated personal information through the transceiver 130. In other words, the processor 110 updates the personal information that is the same as the edited content in the edited first resume item through the transceiver 130. In an embodiment, the resume item includes a synchronization functional icon. For example, if the user modifies the text box 311 in the resume item 420 on the resume display area 300 of FIG. 4 from "Bob" to "John" and sends a synchronization request to the processor 110 by clicking the synchronization functional icon, the processor 110 may synchronously update the content of the personal information input by the user and modify "Bob" recorded in the personal information to "John" according to the edited content. In other words, with the design that the processor 110 detects whether the user clicks the synchronization functional icon, the user may choose whether to synchronously update the edited text box in the resume item to other item templates or resume items with the same type of text box, or synchronously update the edited text box in the resume item to the personal information stored in the storage medium 120. Accordingly, the disclosure provides a method for bidirectional and instantly updated editing of a resume for the user to save a great amount of operation time in editing a resume.

In an embodiment, the first item template and the second item template may be longitudinally arranged on the resume display area according to a drag sequence. In this embodiment, the first item template and the second item template are predetermined to be longitudinally arranged on the resume display area according to the sequence of dragging or pulling. In other words, the processor 110 may sequentially and longitudinally arrange the corresponding resume items on the resume display area according to the sequence in which the item templates are dragged.

Figure 6A:
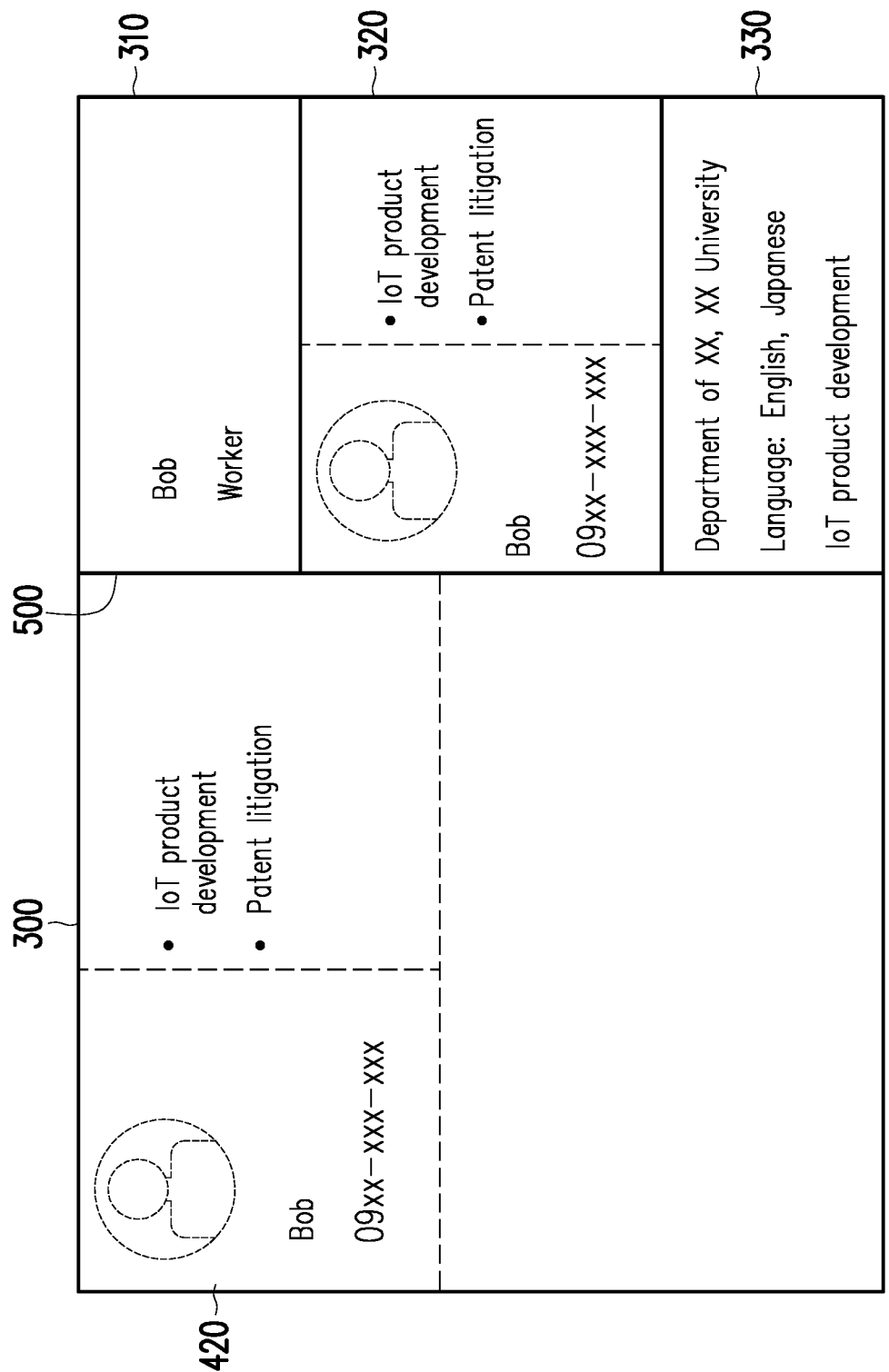
FIG. 6A and FIG. 6B are schematic diagrams of an operation according to an embodiment of the disclosure.
Figure 6B:
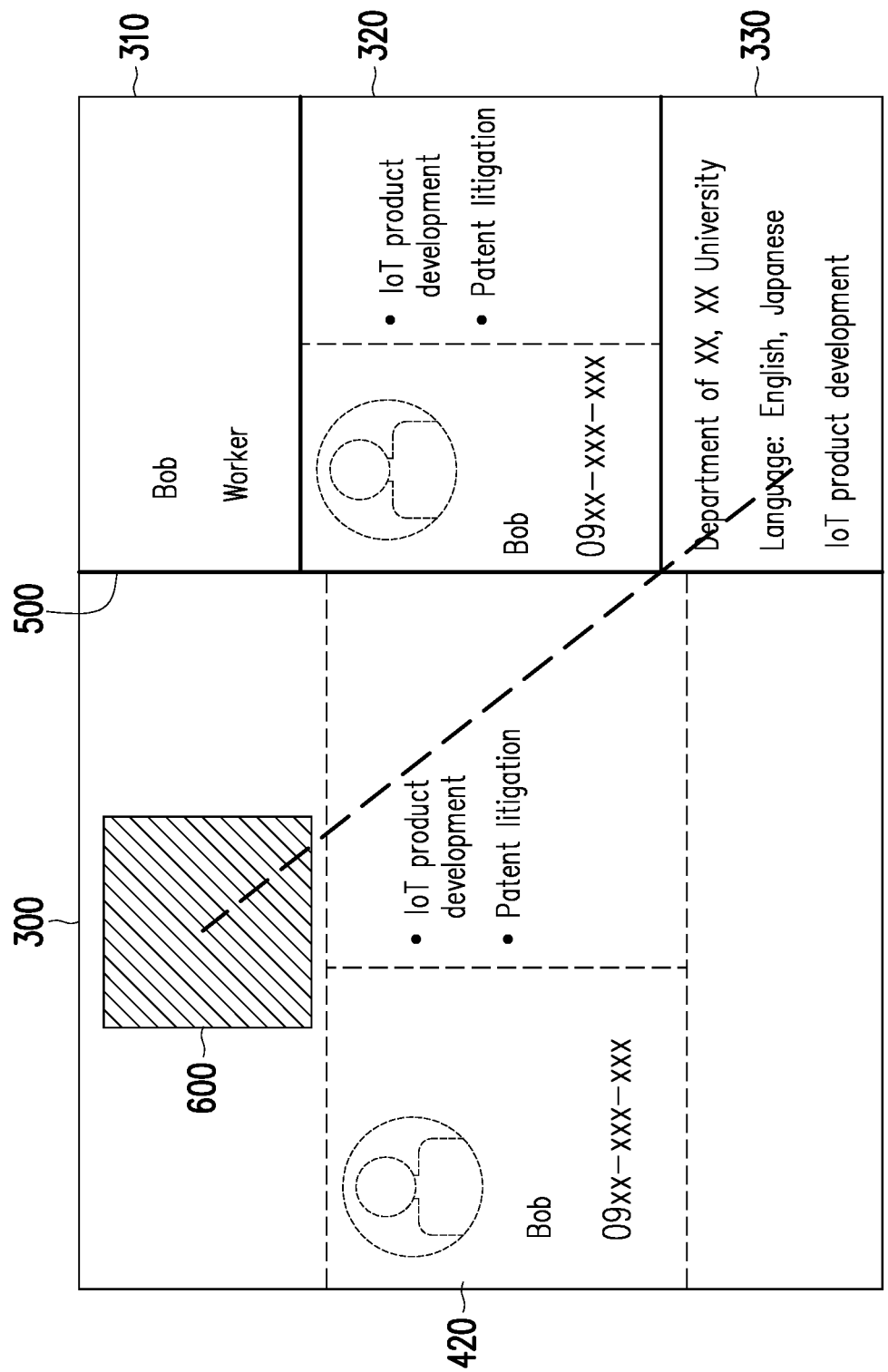

FIG. 6A and FIG. 6B are schematic diagrams of an operation according to an embodiment of the disclosure. With reference to FIG. 6A and FIG. 6B, the item template 310, the item template 320, and the item template 330 are arranged on the right side of the resume display area 300, and the resume display area 300 includes the resume item 420 thereon. If the processor 110 receives a drag operation through the transceiver 130 and drags the item template 330 to the resume display area 300, the processor 110 may generate a new resume item by dragging the item template 330 to the resume display area 300. The drag operation may include an upward/downward operation command. The processor 110 may determine to arrange the new resume item above or below the resume item 420 in the resume display area 300 according to the upward/downward operation command. More specifically, in response to the item template 330 being dragged over the boundary 500, the processor 110 displays a tip box 600 above or below the resume item 420 in the resume display area 300 for the user to clearly know the position of the new resume item to be generated corresponding to the item template 330. In another embodiment, the item templates (e.g., the item templates 310, 320, and 330) arranged on the right side of the resume display area 300 do not present the personal information input by the user, and the resume item (e.g., the resume item 420) presented in the resume display area 300 presents the content of the personal information after the processor 110 drags any one of the item templates (e.g., the item templates 310, 320, and 330) to the resume display area 300 according to the drag operation.

Figure 7A:
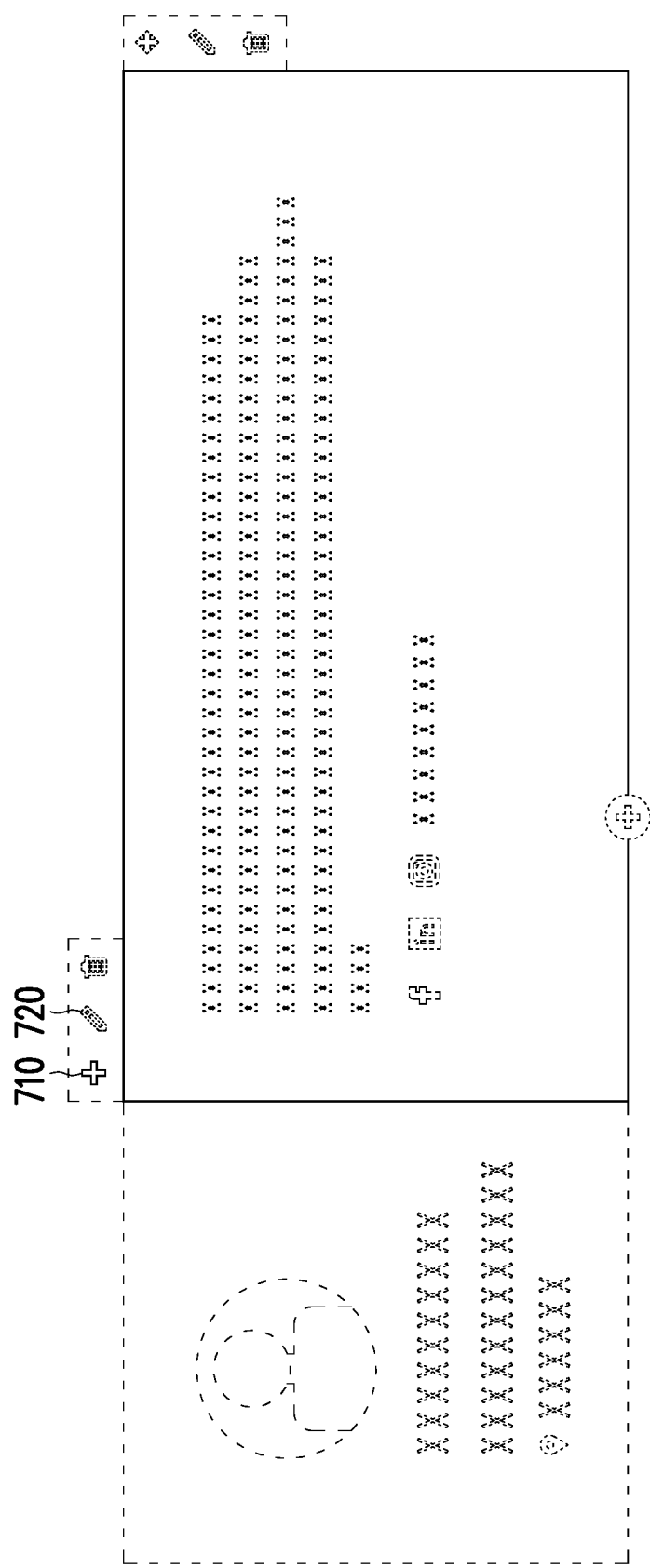
FIG. 7A, FIG. 7B, and FIG. 7C are schematic diagrams of an adding operation according to an embodiment of the disclosure.
Figure 7B:
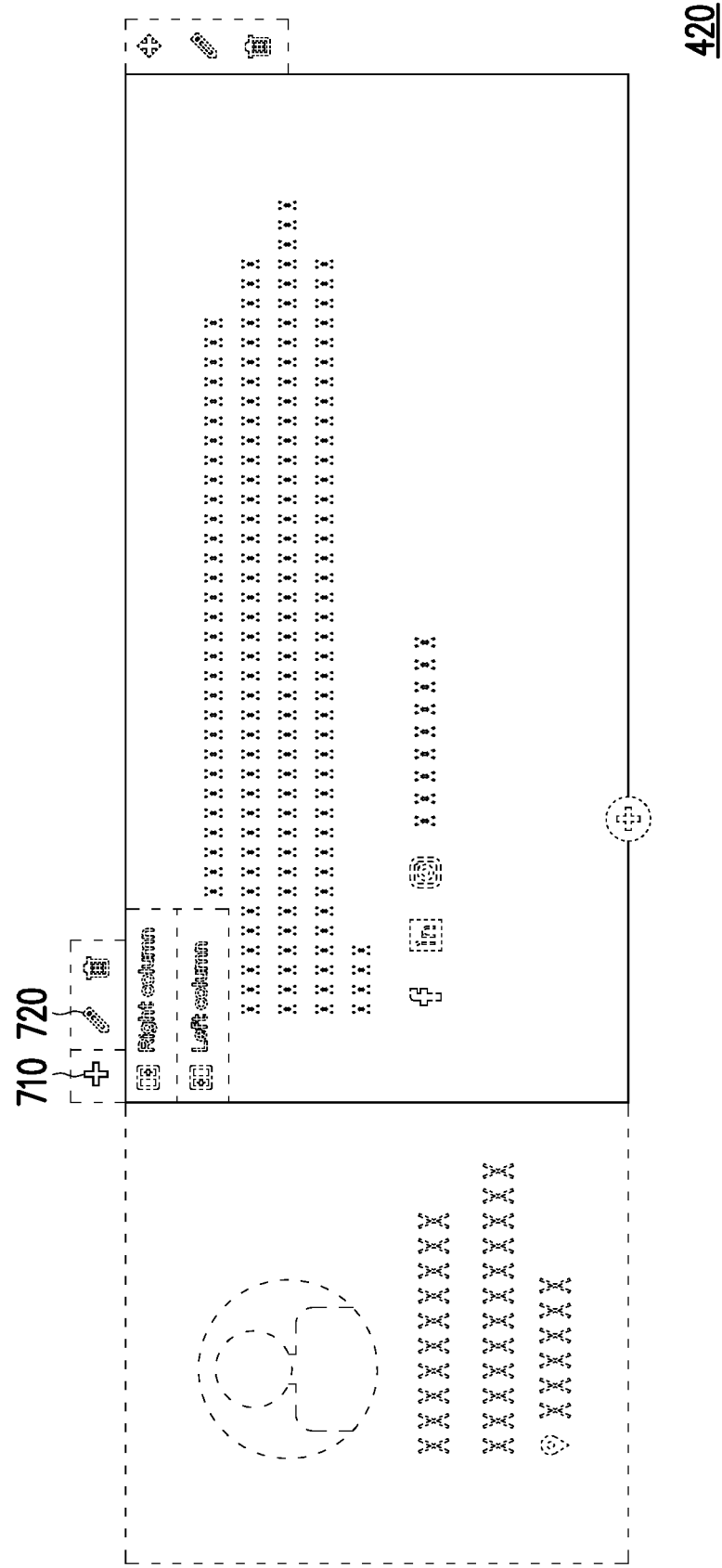
Figure 7C:
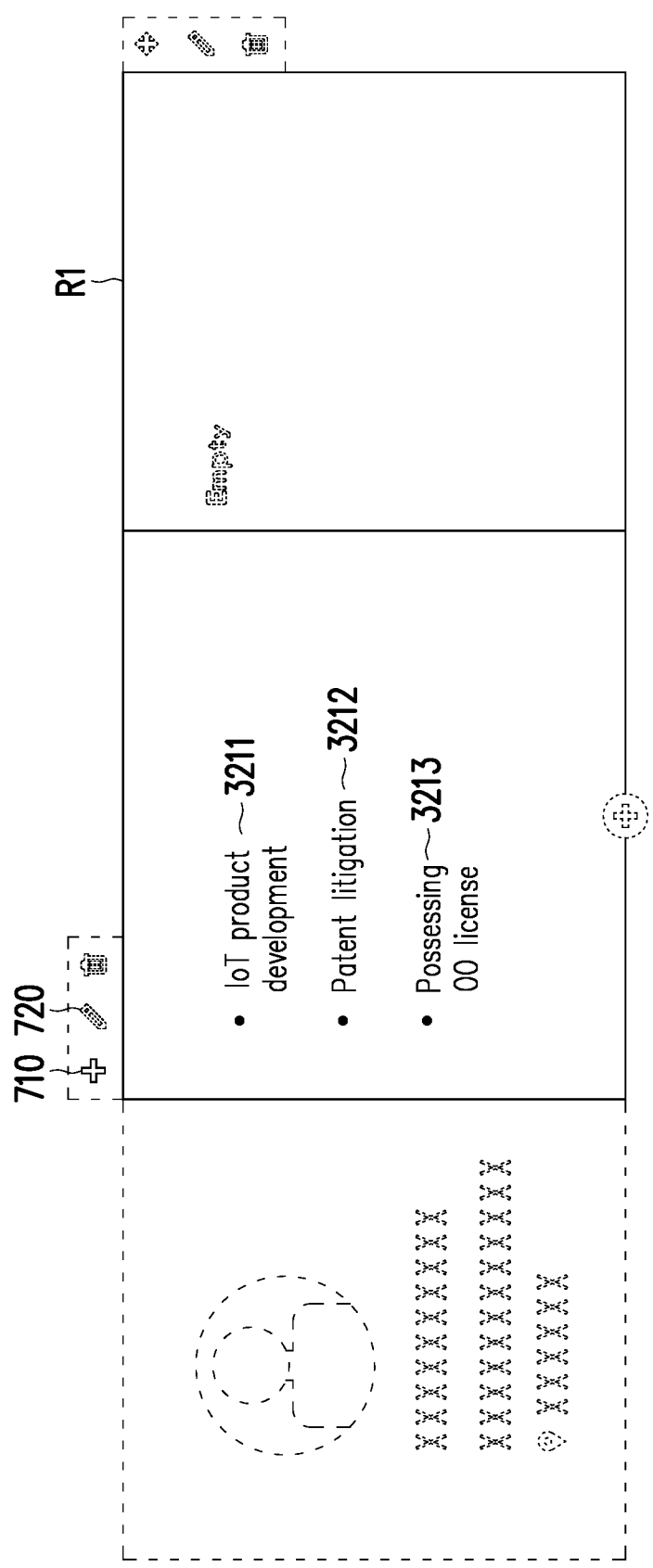

FIG. 7A, FIG. 7B, and FIG. 7C are schematic diagrams of an adding operation according to an embodiment of the disclosure. In an embodiment, the first resume item on the resume display area 300 includes a first functional icon. The processor 110 may divide the resume display area into a first column and a second column in response to receiving the second input operation corresponding to the first functional icon through the transceiver 130. The first resume item and the second resume item may be respectively disposed in the first column and the second column. Taking FIG. 7A to 7C as an example, assuming that the predetermined number of columns of the resume display area 300 is two, as shown in FIG. 7A, then the user may modify the number of columns of the resume display area 300 to three through the second input operation corresponding to a first functional icon 710 of the resume item 420, as shown in FIG. 7C. Specifically, the processor 110 may display a "Right column" icon and a "Left column" icon after receiving the second input operation corresponding to the first functional icon 710, as shown in FIG. 7B. If the user selects the "Right column" icon, the processor 110 may generate a new column to the right of the resume item 420 in the resume display area 300. The new column may include an editing area R1, and the user may customize the editing area R1 to display information such as text or data. Comparatively, if the user selects the "Left column" icon, the processor 110 may generate a new column to the left of the resume item 420 in the resume display area 300. The new column may include an editing area R1, and the user may customize the editing area R1 to display information such as text or data. Accordingly, in the disclosure, diversified presentation and high controllability of a resume after being edited are achieved, so that the user can output a resume that is both beautiful and unique.

FIG. 8A and FIG. 8B are schematic diagrams of a labeling operation according to an embodiment of the disclosure. In an embodiment, the first resume item on the resume display area 300 includes a second functional icon. In response to receiving the second input operation corresponding to the second functional icon through the transceiver 130, the processor 110 may establish a label corresponding to the text box in the first resume item, and update at least one item template (or at least one resume item) corresponding to the label in the plurality of item templates (or the plurality of resume items) according to the text box. In other words, the processor 110 may establish a corresponding label according to the text box in the resume item. For example, as shown in FIG. 8A, the processor 110 may establish a corresponding label for the text box in the item template. The label may be associated with any one below: name, title, work experience, contact, education, skills, languages, professional license, or other information. As shown in FIG. 8B, the user may establish a customized label according to a specific resume item or text box to improve the flexibility and convenience in editing a resume. In addition, the processor 110 displays fields synchronized with and corresponding to the labels as shown in FIG. 8A and FIG. 8B on the display in response to the operation of the synchronization functional icon for the user to update and confirm the label corresponding to the specific text box.

As shown in FIG. 8A and FIG. 8B, in an embodiment, the processor 110 may configure the label as a predetermined label corresponding to a predetermined text box in response to the text box matching the predetermined text box corresponding to the item template. In other words, by matching the text box input by the user and the predetermined text box of the item template in the storage medium 120, the processor 110 provides at least one predetermined label to improve the efficiency and operational convenience in editing a resume. In another embodiment, in response to the text box not matching the predetermined text box, the processor 110 may receive a third input operation through the transceiver, and establish a label according to the third input operation. For example, when the result of matching the predetermined text box and the text box input by the user by the processor 110 is non-matching, the processor 110 displays a text box of non-matching in red on the display 140 to remind the user to manually select or create the relevant labels, achieving further classification and integration of the input resume data.

With reference to FIG. 7C, FIG. 8A, and FIG. 8B, if the processor 110 receives the second input operation corresponding to a second functional icon 720 of the resume item 420 after the user edits text boxes 3211, 3212, and 3213 in the resume item, the processor 110 may determine whether the text box in the edited resume item 420 matches a predetermined text box corresponding to the item template 320 shown in FIG. 3. For example, it is assumed that the text box 3211 matches the predetermined text box of the item template 320. For example, the predetermined text box corresponds to "professional skill", and the content "IoT development" of the text box 3211 matches "professional skill". In this case, the processor 110 may configure the label of the text box 3211 as a predetermined label "professional skill" corresponding to the predetermined text box, as shown in FIG. 8A. Comparatively, it is assumed that the text box 3212 does not match the predetermined text box of the item template 320. For example, the predetermined text box corresponds to "education", and the content "patent litigation" of text box 3212 does not match "education". In this case, the processor 110 may present the content of the text box 3212 with predetermined text information or predetermined font format information (e.g., bold font or red font) on the display 140 to prompt the user to establish a label for the text box 3212.

In an embodiment, the processor 110 may fill predetermined data into the text box in the first item template in response to the personal information lacking data matching the text box. The predetermined data includes at least one of the predetermined text information and the predetermined font format information. In other words, the processor 110 may write the predetermined data stored in the storage medium 120 into the predetermined data matching the field name of personal information lacked in the personal information. Taking "item template 1" in Table 1 as an example, if the personal information received by the processor 110 lacks data matching the text box "title" in "item template 1", the processor 110 may fill the predetermined data "worker" into the text box "title" to generate the resume item 310 as shown in FIG. 3.

Figure 9:
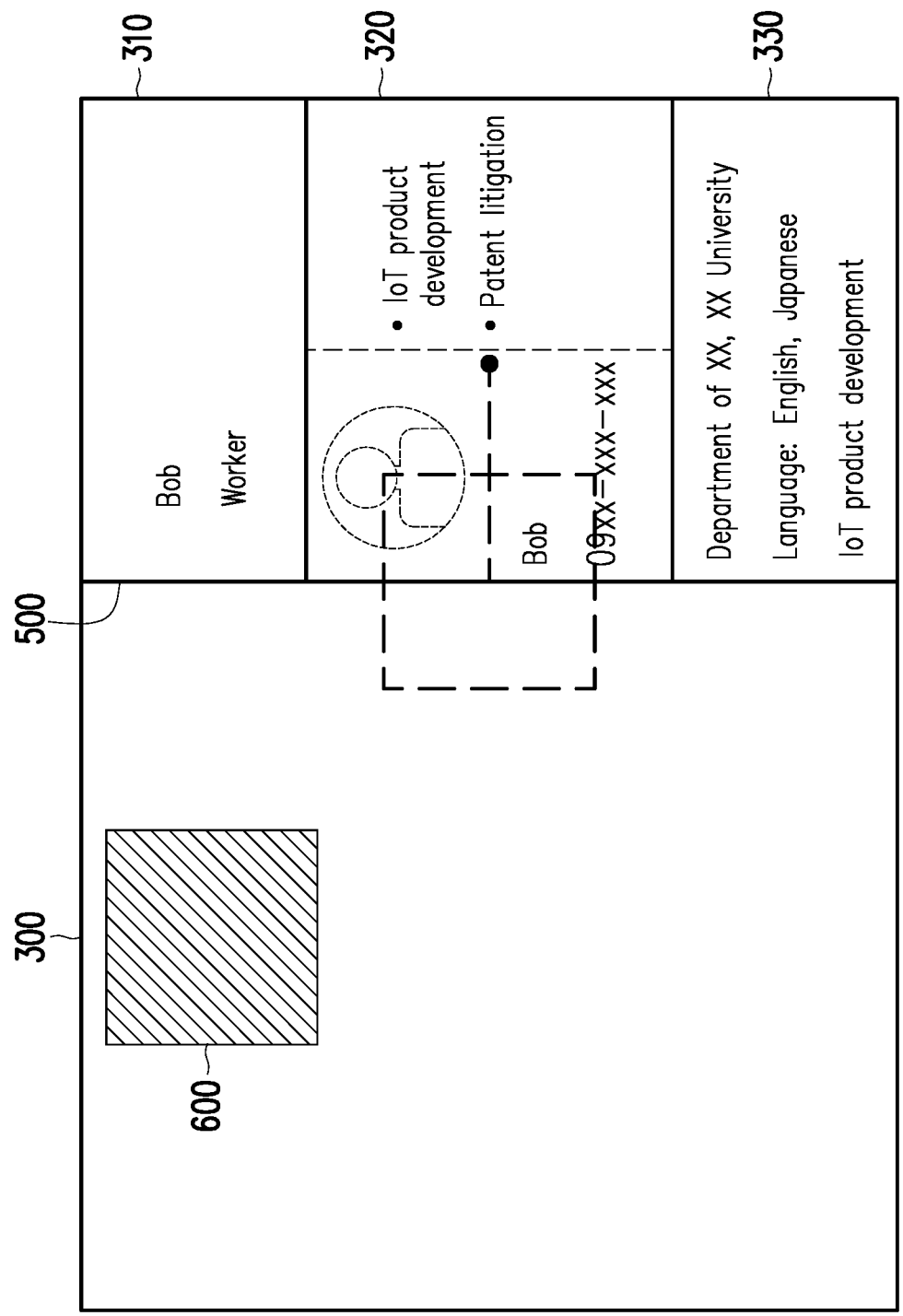
FIG. 9 is a schematic diagram of a drag operation according to an embodiment of the disclosure.

FIG. 9 is a schematic diagram of a drag operation according to an embodiment of the disclosure. The processor 110 may display the tip box 600 corresponding to a first position in the resume display area 300 through the display 140 in response to the item template 320 being dragged to the first position of the resume display area 300. More specifically, the processor 110 displays the tip box 600 on the resume display area 300 in response to the center point of the item template 320 being dragged to or over the boundary 500. In other words, when the processor 110 receives the first input operation (e.g., a drag operation), the processor 110 may display the tip box 600 corresponding to the position of the first input operation on the resume display area 300, and the processor 110 may drag the item template to the position corresponding to the tip box in response to the first input operation.

In addition, it is assumed that the resume display area 300 and a plurality of item templates are displayed in the display 140 according to the layout shown in FIG. 9, and the plurality of item templates are located on the right side of the resume display area 300. The first input operation may be subdivided into a display position confirmation operation (i.e., an operation of long-pressing and dragging the resume item) and a confirmation operation (i.e., an operation of dropping the dragged resume item). After the processor 110 receives the display position confirmation operation through the transceiver 130, the processor 110 may drag the item template 320 onto the resume display area 300. If a first portion (e.g., fifty percent) of the item template 320 is over the boundary 500 between the plurality of item templates and the resume display area 300, the processor 110 may display the tip box 600 on the resume display area 300 through the display 140. The tip box 600 is configured to indicate the position in the resume display area 300 at which the dragged item template 320 is to be placed. Next, the processor 110 may receive the confirmation operation and generate the resume item corresponding to the content of the item template 320 at the position of the tip box 600. In an embodiment, the processor 110 may present the tip box 600 as a gray block through the display 140.

In summary of the foregoing, the electronic device of the disclosure achieves instant and bidirectional editing, facilitated operation, high controllability, and diversified typesetting modes in editing a resume. Through the display and the processor of the disclosure, the user may arrange the resume items in blank item templates by dragging and dropping to improve the operational smoothness when the user edits a resume. In other words, the electronic device and the method for editing a resume of the disclosure achieve user-friendliness, time saving in editing, and bidirectional editing.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device for editing a resume, comprising:
    a display, configured to display a resume display area, a first item template and a second item template, wherein the first item template has a first text box, the second item template has a second text box, a content of the first text box and a content of the second text box are the same, and the resume display area and the first item template are separated by a boundary; and
    a processor, configured to:
        receive personal information;
        input the personal information into the first item template and the second item template;
        receive a first input operation to drag the first item template to the resume display area to generate a first resume item corresponding to the first item template, wherein the first resume item has the first text box and a first functional icon;
        receive a second input operation to edit the content of the first text box of the first resume item on the resume display area;
        update the personal information and the content of the second text box of the second item template according to the edited content of the first text box; and
        divide the resume display area into a first column and a second column in response to receiving a third input operation corresponding to the first functional icon.

2. The electronic device according to claim 1, wherein the display is further configured to display a third item template, and the processor is further configured to receive the first input operation to drag the third item template to the resume display area to generate a third resume item corresponding to the third item template; and the first resume item and the third resume item are respectively disposed in the first column and the second column.

3. The electronic device according to claim 1, wherein the first resume item on the resume display area comprises a second functional icon, the processor establishes a label corresponding to the first text box in the first item template in response to receiving a third input operation corresponding to the second functional icon, and the processor updates the content of the second text box of the second item template corresponding to the label according to the first text box.

4. The electronic device according to claim 3, wherein the processor configures the label as a predetermined label in response to the first text box matching a predetermined text box.

5. The electronic device according to claim 3, wherein the processor receives a fourth input operation in response to the first text box not matching a predetermined text box, and the processor establishes the label according to the fourth input operation.

6. The electronic device according to claim 1, wherein the processor fills predetermined data into the first text box in the first item template in response to the personal information lacking data matching the first text box, and the predetermined data comprises at least one of predetermined text information and predetermined font format information.

7. The electronic device according to claim 1, wherein the processor displays a tip box corresponding to a first position in the resume display area through the display in response to the first item template being dragged to the first position of the resume display area,
    wherein the processor displays the tip box through the display in response to the e first portion of the first item template being dragged over the boundary.

8. A method of editing a resume, comprising:
    displaying a resume display area, a first item template and a second item template, wherein the first item template has a first text box, the second item template has a second text box, a content of the first text box and a content of the second text box are the same, and the resume display area and the first item template are sep crated by a boundary;
    receiving personal information;
    inputting the personal information into the first item template and the second item template;
    receiving a first input operation to drag the first item template to the resume display area to generate a first resume item corresponding to the first item template, wherein the first resume item has the first text box and a first functional icon;
    receiving a second input operation to edit the content of the first text box of the first resume item on the resume display area;
    updating the personal information and the content of the second text box of the second item template according to the edited content of the first text box; and
    dividing the resume display area into a first column and a second column in response to receiving a third input operation corresponding to the first functional icon.

9. The method according to claim 8, further comprising:
    displaying a third item template, and
    receiving the first input operation to drag the third item template to the resume display area to generate a third resume item corresponding to the third item template; and the first resume item and the third resume item are respectively disposed in the first column and the second column.

10. The method according to claim 8, wherein the first resume item on the resume display area comprises a second functional icon, and the method further comprises establishing a label corresponding to the first text box in the first item template in response to receiving a third input operation corresponding to the second functional icon, and updating the content of the second text box of the second item template corresponding to the label according to first the text box.

11. The method according to claim 10, further comprising configuring the label as a predetermined label in response to the first text box matching a predetermined text box.

12. The method according to claim 10, further comprising receiving a fourth third input operation in response to the first text box not matching a predetermined text box, and establishing the label according to the fourth input operation.

13. The method according to claim 8, further comprising filling predetermined data into the first text box in the first item template in response to the personal information lacking data matching the first text box, wherein the predetermined data comprises at least one of predetermined text information and predetermined font format information.

14. The method according to claim 8, further comprising displaying a tip box corresponding to a first position in the resume display area through the display in response to the first item template being dragged to the first position of the resume display area, wherein displaying the tip box corresponding to the first position in the resume display area through the display in response to the first item template being dragged to the first position of the resume display area comprises displaying the tip box through the display in response to the a-first portion of the first item template being dragged over the boundary.

\* \* \* \* \*